United States Patent [19]

Davey

[11] Patent Number: 5,124,827
[45] Date of Patent: Jun. 23, 1992

[54] FERROELECTRIC LIQUID CRYSTAL CELLS

[75] Inventor: Anthony B. Davey, Stortford Herts, England

[73] Assignee: STC PLC, London, United Kingdom

[21] Appl. No.: 646,866

[22] Filed: Jan. 28, 1991

[30] Foreign Application Priority Data

Jan. 31, 1990 [GB] United Kingdom ............... 9002105

[51] Int. Cl.$^5$ ............................................... G02F 1/13
[52] U.S. Cl. ......................................... 359/100; 359/76
[58] Field of Search ............... 350/350 S, 350 R, 340, 350/334, 346; 359/99, 100, 76, 77

[56] References Cited

U.S. PATENT DOCUMENTS

| | | | |
|---|---|---|---|
| 4,762,400 | 8/1988 | Shimoda et al. | 350/350 S |
| 4,813,767 | 3/1989 | Clark et al. | 350/341 |
| 4,838,663 | 6/1989 | Lagerwall et al. | 350/350 S |
| 4,932,758 | 6/1990 | Hanyu et al. | 350/350 S |
| 4,969,719 | 11/1990 | Bradshaw et al. | 350/350 S |

FOREIGN PATENT DOCUMENTS

| | | | |
|---|---|---|---|
| WO/8706020 | 10/1987 | PCT Int'l Appl. | 350/350 S |
| WO/8706021 | 10/1987 | PCT Int'l Appl. | 350/350 S |

OTHER PUBLICATIONS

Kondo et al. "A Practical Method of Preparing This Homogeneous Ferrolactic Smectic Cells", Japanese Journal of Appl. Phys., vol. 22 No. 2, Feb. 1983, pp. L85–L87.

Y. Sato et al. 'High Quality Ferroelectric Liquid Crystal Display with Quasi-Bookshelf Layer Structure', Japanese Journal of Applied Physics, vol. 28, No. 3, Mar. 1989, pp. L483–L486.

*Primary Examiner*—Stanley D. Miller
*Assistant Examiner*—Huy K. Mai
*Attorney, Agent, or Firm*—Lee, Mann, Smith, McWilliams, Sweeney & Ohlson

[57] ABSTRACT

Relaxation effects of a uniform mode ferroelectric liquid crystal cell with obliquely evaporated alignment layers, characterized by the reduction in apparent tilt angle consequent upon removal of a switching stimulus, are eliminated by a poling treatment that typically comprises the application of a relatively low frequency (c. 500 Hz) relatively large amplitude (c. 60 volts peak-to-peak) electric potential difference across the thickness of the liquid crystal layer.

15 Claims, 2 Drawing Sheets

FERROELECTRIC LIQUID CRYSTAL CELLS

BACKGROUND TO THE INVENTION

This invention relates to ferroelectric liquid crystal cells, and is particularly concerned with the quality of the bistability operation exhibited by such cells.

A paper by Y Sato et al entitled 'High Quality Ferroelectric Liquid Crystal Display with Quasi-Bookshelf Layer Structure', Japanese Journal of Applied Physics Vol. 28, No. 3, 1989 pp L 483-L 486, to which attention is directed, describes how the memory properties of a ferroelectric cell with one form of rubbed alignment can be significantly improved by pre-treatment of the cell with a relatively large amplitude low frequency field, but that in the case of a similar rubbed alignment cell constructed with a different material for the rubbed alignment layers the pre-treatment produced no apparent change in memory properties. The authors explain that the bookshelf layer structure (also sometimes known as bookstack layer structure) that Clark and Lagerwall originally proposed is now known to be difficult to achieve, and that a typical 'uniform mode' ferroelectric cell relaxes after removal of a switching stimulus in a way that significantly reduces the contrast between the two switched states. The authors then explain that, in the case of a cell with rubbed N-methyl aminopropyl triethoxysilane alignment layers, the pre-treatment has the effect of changing the texture of the relaxed state, removing zigzag defects and replacing them with long slender domains, and that thereafter ordinary switching of the cell produced substantially fully switched states that show no noticeable relaxation upon removal of the switching stimulus. In the case of a cell with rubbed polyimide alignment layers, the authors report that the pre-treatment produced a similar change in appearance, but that this was not attended by an improvement in memory properties; in ordinary switching of the cell it relaxed after removal of the stimulus in substantially the same way as it used to relax before pre-treatment.

A somewhat similar effect is also reported in UK Patent Application GB 2 183 054A in which a similar treatment is reported to have been applied to various uniform mode ferroelectric cells, all with rubbed polymer alignment layers, but using different polymers in different cells. In each case, including the example using polyimide alignment layers, memory properties were reported as being improved by the substantial elimination of relaxation effects, though the effect of the treatment was said to be 'of finite duration' and thus typically requiring 'refreshing after standing for several days'.

SUMMARY OF THE INVENTION

A primary object of the present invention is the provision of ferroelectric liquid crystal cells with improved memory properties.

A further object of the present invention is the provision of a method whereby the effective tilt angle presented by the cell at a chosen operating temperature can be reduced from a maximum value, and thus provide faster switching at the expense of a reduction in contrast ratio achievable with the cell placed between appropriately oriented polarisers.

According to the present invention there is provided a method of making a ferroelectric liquid crystal cell that exhibits bistability in the absence of any sustaining applied field, wherein a liquid crystal layer is confined between two surfaces at least one of which is the surface of an obliquely evaporated layer of inorganic material having a surface texture that, in a non-inclined liquid crystal phase of the liquid crystal layer, promotes alignment of the liquid crystal molecules in contact therewith in a direction lying in or having a major component in the plane of said textured surface, wherein the material of the liquid crystal layer is cooled so as to make a transition into a ferroelectric inclined smectic phase, said cooling being under conditions inducing a non-planar prismatic arrangement of the smectic layers in the inclined smectic phase with the prismatic axis being defined in relation to the axis of oblique evaporation and the plane of the textured surface, wherein an alternating potential, hereinafter referred to as poling, is applied across the thickness of the cell of sufficient magnitude to induce a planarising rearrangement of the smectic layer structure providing a substantially bookshelf arrangement of the smectic layers that, while the liquid crystal layer is maintained at the temperature of poling, persists after removal of said potential.

BRIEF DESCRIPTION OF THE DRAWINGS

There follows a description of ferroelectric liquid crystal cells, and their manufacture, embodying the invention in preferred forms. The description refers to the accompanying drawings in which.

DETAILED DESCRIPTION OF PREFERRED EMBODIMENTS

Figure 1:
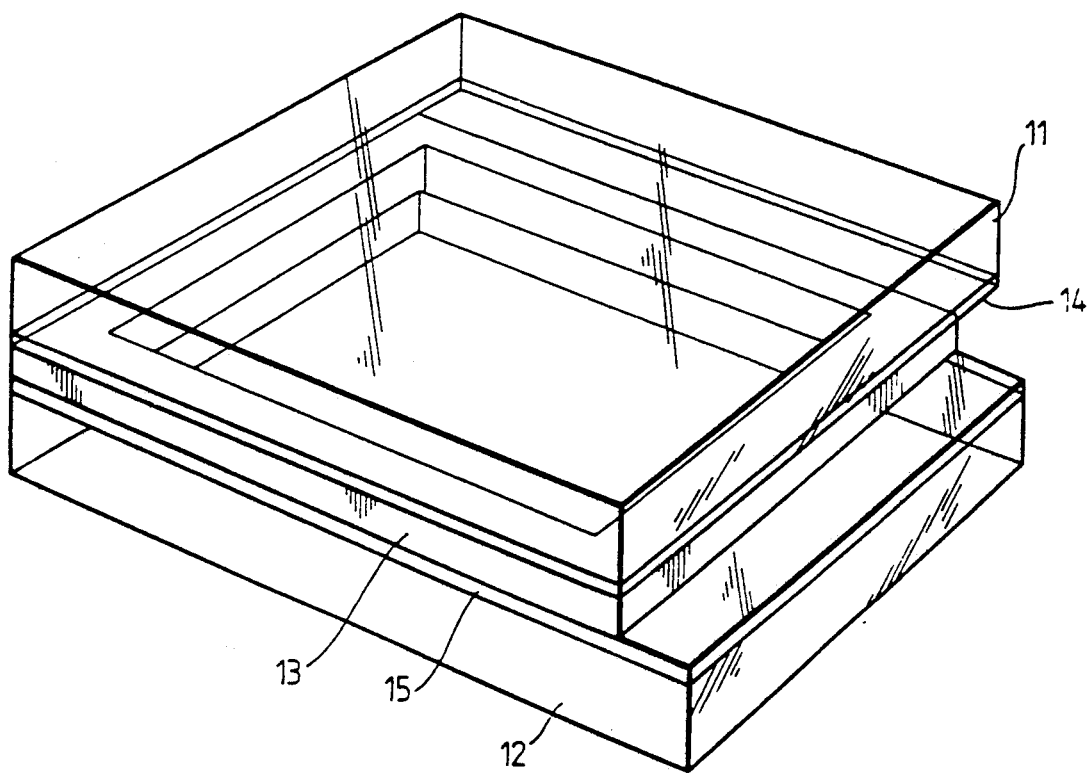
FIG. 1 depicts a schematic perspective view of a liquid crystal cell.

Referring now to FIG. 1, a hermetically sealed envelope for a liquid crystal layer is formed by securing together two glass sheets 11 and 12 with a perimeter seal 13. The inward facing surfaces of the two sheets carry transparent electrode layers 14 and 15 of indium tin oxide, and one or alternatively both of these electrode layers are covered, at least within the display area defined by the perimeter seal, with an obliquely evaporated layer (not shown), of inorganic material, such as silicon monoxide, provided for molecular alignment purposes. If the cell has obliquely evaporated layers on both its inward facing major surfaces, it is assembled with the planar components of the directions of oblique evaporation aligned parallel with each other or antiparallel.

In the case of SiO alignment layers deposited by oblique evaporation at 60°±15° to the surface normal, which is the preferred angular range, the molecular alignment direction is substantially normal to the evaporation direction and lies substantially in the plane of the surface. The absence of any significant out of plane tilt of the liquid crystal molecules at the confining surfaces means that the parallel and antiparallel arrangement of the confining surfaces are effectively equivalent. On the other hand, in the case of SiO alignment layers obliquely evaporated at 80°±5° to the surface normal the molecular alignment direction lies in the plane containing the surface normal and the evaporation direction, and is tilted out of the plane of its surface by about 15° to 30°, and so parallel and antiparallel arrangements are significantly different. The parallel arrangement, which provides molecular alignment in the same direction at both alignment surfaces tends to produce poor alignment of the smectic layers and a resulting patchy appearance, whereas the antiparallel arrangement that gives rise to a splay in directions of molecular alignment tends to produce a better alignment of the smectic layers, but with a higher density of defects than typically achieved with the 60°±15° evaporation.

Before the electrode layers 14 and 15 are covered with the obliquely evaporated material, each one is patterned to define a set of strip electrodes (not shown) that individually extend across the display area and on out to beyond the perimeter seal to provide contact areas to which terminal connection may be made. In the assembled cell the electrode strips of layer 14 extend transversely with respect to those of layer 15 so as to define a pixel at each elemental area where an electrode strip of layer 15 is overlapped by a strip of layer 14. The thickness of the liquid crystal layer contained within the resulting envelope is determined by a light scattering of polymeric spheres of uniform diameter throughout the area of the cell. Conveniently the cell is filled by applying a vacuum to an aperture (not shown) through one of the glass sheets in one corner of the area enclosed by the perimeter seal so as to cause the liquid crystal medium to enter the cell by way of another aperture (not shown) located in the diagonally opposite corner. (Subsequent to the filling operation the two apertures are sealed). The filling operation is carried out with the filling material heated into its nematic or isotropic phase so as to reduce its viscosity to a suitable low value. It will be noted that the basic construction of the cell is similar to that of, for instance some forms of twisted nematic, except of course for the parallel alignment of the oblique evaporations.

Typically the thickness of the perimeter seal 13, and hence also of the liquid crystal layer, is between 1.5 to 3 um, but thinner or thicker layer thicknesses may be required to suit particular applications. A preferred thickness is 2 um. A suitable material for the filling is the smectic C eutectic marketed by BDH of Poole in Dorset under the designation of SCE 13. This material, which exhibits negative dielectric anisotropy at least over the frequency range from 1 kHz to 40 kHz, passes through the nematic and smectic A phases on cooling into the smectic C phase from the isotropic phase. In the case of a 2 um thick liquid crystal layer confined between the rubbed surfaces, the entry of the material into the smectic A phase causes the smectic layers to be formed with bookshelf alignment and, while this alignment of the smectic layers appears not to be precisely preserved when the material makes the transition into the smectic C phase, the general direction of extent of the smectic layers within the plane of the liquid crystal layer does appear to be preserved.

For the addressing of this cell on a line-by-line basis it is convenient for a charge-balanced bipolar strobe pulse to be applied in turn to the row electrodes of the cell constituted by the strip electrodes of electrode layer 14 while charge-balanced bipolar data pulses are applied in parallel to the column electrodes which are constituted by the strip electrodes of electrode layer 15. Alternatively, the bipolar strobe pulses can be replaced with unipolar ones, these being synchronised with the first or second halves, preferably the first halves, of the data pulses. Charge balance is conveniently restored by alternating the polarity of the strobe pulses with successive scans.

Figure 2A:
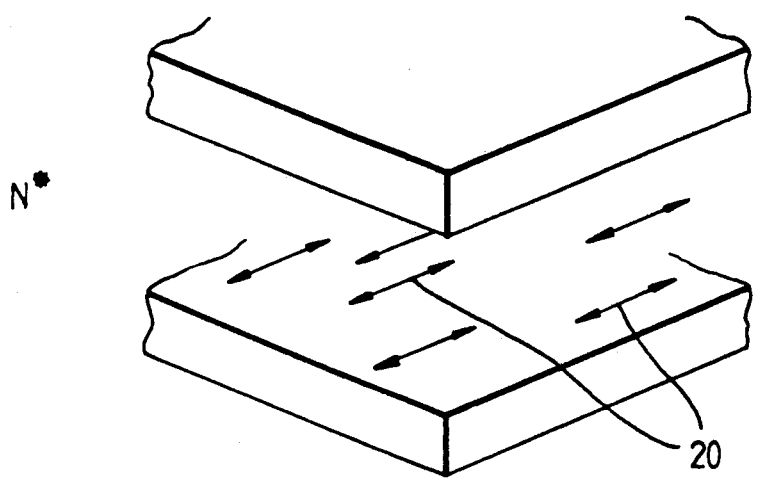
FIG. 2a-c depicts alignment states in the phase sequence $$N^* - S_A - S_C^*$$
Figure 2B:
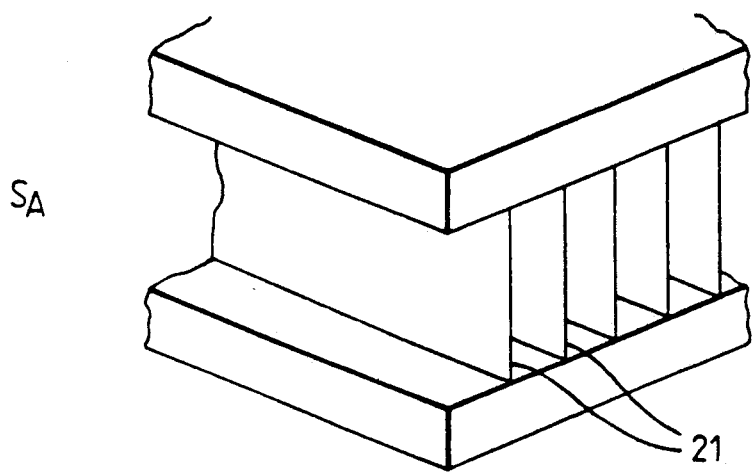
Figure 2C:
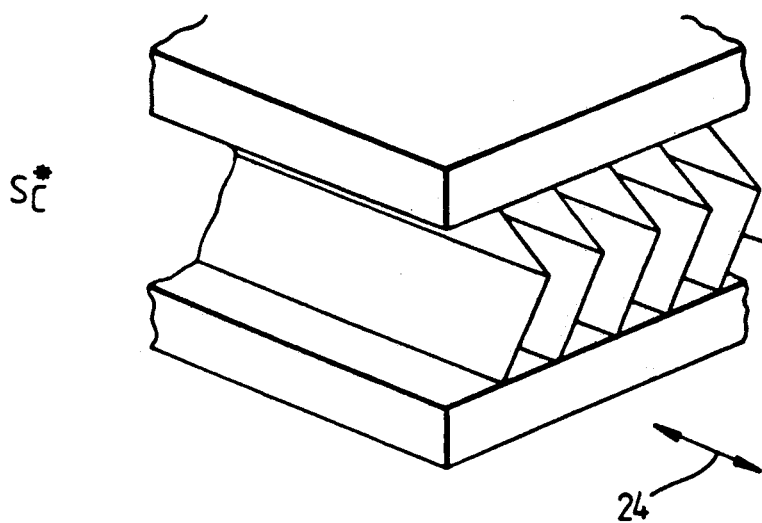

A ferroelectric liquid crystal, such as SCE 13, which exhibits the phase sequence:

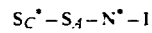

$$S_C^* - S_A - N^* - I$$

is conveniently aligned by cooling from the isotropic phase into the $S_C^*$ phase. Entry into the nematic phase induces an ordering of the average directions of the liquid molecules, with the average molecular directions of the liquid crystal molecules adjacent the obliquely evaporated layer on at least one of the confining surfaces being aligned in a specific direction lying in the plane of that surface. The chiral material of the liquid crystal layer is substantially pitch compensated at a temperature close to the temperature at which the material enters the $S_A$ phase from the nematic phase. In consequence, as the material is about to enter the $S_A$ phase, the pitch, while remaining in the nematic phase, is large compared with the thickness of the cell. Thus at this point the molecular alignment becomes substantially planar homogeneous alignment through the whole thickness of the layer as indicated by the arrows 20 of FIG. 2a. This molecular alignment is preserved on entering the $S_A$ phase. Thus the smectic layers 21 (FIG. 2b) of the $S_A$ phase are established with planar alignment in planes extending at right-angles to the planes of the confining surfaces of the liquid crystal layer. On entry into the $S_C$ phase these smectic layers become disturbed and assume a chevron structure 23 (FIG. 2c). During this distortion the smectic layers appear to remain pinned at the confining surfaces, and so the distorted layers are prismatic, with the prismatic axial direction indicated by arrow 24 aligned with the direction defined by the intersection of the $S_A$ smectic layers and the confining surfaces.

On cooling into this $S_C^*$ phase, defects known as zig-zag defects are observable. These are believed to arise from disclinations associated with the chevron structure produced by the cooling process in combination with small defects in the monodomain structure of the liquid crystal arising from particles, surface defects in the confining surfaces or other discontinuities.

When in the $S_C^*$ state, the application of an unidirectional field across the thickness of the layer can be used to switch the liquid crystal layer into one state, while if the field direction is reversed, the layer is switched into the other state. These two states typically exhibit tilt angles substantially equal to the intrinsic tilt angle of the liquid crystal material employed, but neither state persists after removal of the applied field. Instead, each state relaxes back into a state that can be characterised as one having a significantly reduced effective tilt angle. Thus in the case of the $S_C^*$ material SCE 13 at 30° C., the tilt angle while a switching field is employed is about 20°, but relaxes back to an effective tilt angle of less than 8° after removal of the switching field.

The application of a relatively low frequency field, whose period is longer than the response time of the liquid crystal material at the temperature of the application of the field, for instance a frequency of less than 1 kHz at a temperature of 35° C. for application to a cell filled with SCE 13 whose response time at this temperature is about 100 us, can partially remove the zig-zag defects to which previous reference has been made. However, as the strength of the applied field is increased a new type of defect appears, which likewise appears to be associated with discontinuities in the liquid crystal. These defects have a characteristic 'V' shape and are known as 'bow-waves'.

On applying a still stronger field, many fine lines appear along the molecular alignment direction which partially eliminate earlier defects and leave a relatively defect-free area, except for the continuing presence of the fine lines. The appearance remains substantially unchanged upon removal of this field, indicating that the resulting state is one in which permanent, rather than transient, removal of the chevron structure has occurred to give a substantially perfect bookshelf layer structure. With this structure, when a unidirectional field is applied to switch the layer into one or other of the fully switched states, substantially no relaxation occurs upon removal of the field, at least while the cell is maintained at the same temperature, and thus a high contrast ratio is obtainable in storage mode without recourse to the use of sustaining (stabilisation) fields.

EXAMPLE 1

A 2 um thickness liquid crystal layer cell was constructed with SiO alignment layers evaporated at 60° to the normal. This was filled with BDH liquid crystal SCE 13 which was cooled from isotropic through nematic and $S_A$ phases into the ferroelectric $S_C^*$ phase. Relaxation effects in its switching properties were substantially eliminated by applying a 60 volt peak-to-peak 500 Hz square-wave poling signal across the thickness of the liquid crystal layer for a few seconds while it is maintained at 35° C. After this poling, while the cell continued to be maintained at 35° C., tilt angles of about 20° were sustained indefinitely by the liquid crystal layer after removal of the switching stimulus.

EXAMPLE 2

Identical with example 1 except for the substitution of BDH liquid crystal SCE 12 for SCE 13.

EXAMPLE 3

Identical with example 1 except for the substitution of BDH liquid crystal SCE 9 for SCE 13.

EXAMPLE 4

Identical with example 1 except for the substitution of 60° evaporated $MgF_2$ alignment layers for the SiO ones.

EXAMPLE 5

Identical with example 1 except for the substitution of BDH liquid crystal M 863 for SCE 13.

EXAMPLE 6

Identical with example 1 except for the substitution of BDH liquid crystal M 866 for SCE 13.

All the liquid crystal materials of the examples are materials which exhibit the phase sequence:

$$S_C^* - S_A - N^* - I$$

and which are substantially pitch compensated at temperatures close to their $S_A - N$ transition temperatures. Each of these has, at a temperature of 20° C., a $P_s$ (spontaneous polarization) of not less than 17 $nC/cm^2$. Their $S_A - N^*$ transition temperatures, their Curie temperatures ($S_C^* - S_A$ transition temperatures) and their $P_s$ values (measured at 20° C.) are listed in the following table.

|  | $S_A$-$N^*$ (°C.) | $S_C^*$-$S_A$ (°C.) | $P_S$ ($nC/cm^2$ at 20° C.) |
| --- | --- | --- | --- |
| SCE 9 | 91 | 61 | +33.6 |
| SCE 12 | 80.8 | 66.3 | +17.1 |
| SCE 13 | 86.3 | 60.8 | +27.8 |
| M 863 | 77.5 | 61.4 | +24.9 |
| M 866 | 96.8 | 60.9 | +27.8 |

If other liquid crystal materials are used for which the chirality is not so well pitch compensated, so that the pitch on entry into the $S_A$ phase from the $N^*$ phase is not long compared with the liquid crystal layer thickness, than the molecular alignment quality on entry into the $S_A$ phase is not so good and the smectic layers produced in the $S_A$ phase have a poorer quality, tending to be more heavily broken up into domains.

The mechanism by which the temporary application of the alternating potential (poling) is able to produce a sustained change in the smectic layer structure is not fully understood, but observation of changes induced in that structure by subsequent changes of temperature suggest a possible mechanism. It is found that if a cell is cooled to a certain temperature before poling, then the poling will produce a structure affording a certain measured angle $\phi$ between the two bistable states, $\phi$ being equal to twice the effective tilt angle. If the temperature is now increased to some value still below the Curie temperature, the measured angle $\phi$ is reduced. If the temperature is then restored to its former (poling) value, the measured angle $\phi$ is somewhat increased, but remains significantly smaller than the value produced immediately after poling. On the other hand, if the temperature had been reduced after poling, the measured angle $\phi$ would have been slightly increased, and if then the temperature had been restored to its former value, the measured angle $\phi$ could have been decreased again, this time to substantially the same value as existed before the excursion to lower temperatures. It is also found that the measured angle $\phi$ resulting from poling at a specific temperature is greater than that resulting from poling at a higher temperature and then cooling to this specific temperature.

Thus in the case of a cell containing a 2 um thickness layer of SCE 13 poled at 40° C., the measured angle $\phi$ existing immediately after poling while the cell is still maintained at 40° C. is about 39°. If the temperature is now reduced to about 30° C., the measured angle $\phi$ is increased by about 1o, but falls again to substantially its former value upon reheating the cell back to 40° C. again. If however the cell is heated to 50° C., after poling at 40° C., the measured angle $\phi$ is reduced by about 7.5° C. Cooling of the cell back to 40° C. does not produce a full restoration of the measured angle $\phi$ to its former value, but only increases it by about 1° to leave a deficit of about 6.5°.

The measured angle $\phi$ observed before poling is significantly less than twice the intrinsic tilt angle of the $S_C^*$ material at that temperature. It is believed that this is because the smectic layers do not assume bookshelf geometry as illustrated in FIG. 2(b), but that this chevron geometry results because the layers are pinned at the confining surfaces where they retain the spacing of the smectic layers on entry into the $S_A$ phase from the $N^*$ phase, rather than the natural (unstrained) spacing of $S_C^*$ layers at the existing temperature. It is postulated that the application of the poling field induces strong enough forces to change the pinning at the confining surfaces to a new smectic layer spacing; that lowering the temperature after poling does not produce sufficiently strong forces to change the pinning to a new layer spacing at the confining surfaces; but that raising the temperature above the poling temperature does have this effect.

If this is the case, application of the poling field induces bookshelf geometry of the smectic layers with a smectic layer spacing equal to, or closely approximating to, the natural unstrained spacing of such layers at this temperature. When the poling field is removed, the smectic layers remain pinned at the confining surfaces with the new layer spacing. Under these circumstances, the increase in intrinsic tilt angle of the liquid crystal material, consequent upon a cooling of the cell, will promote a shrinkage in the thickness of the smectic layers. In consequence of the layers being pinned at the confining surfaces, this shrinkage is accommodated by forming a 'chevron' geometry as depicted in FIG. 2(c). This chevron geometry will provide a measured angle $\phi$ that is greater than that of the bookshelf geometry with the smectic layer spacing and intrinsic tilt angle produced by the poling at the higher temperature, but not as great as would be provided by bookshelf geometry and intrinsic tilt angle of this lower temperature (as could be provided by poling at that lower temperature). Restoration of the cell to its former temperature, the temperature at which it was poled, restores the smectic layer spacing to its former value, and thus converts the chevron geometry back to bookshelf geometry, thereby restoring the measured angle $\phi$ to its former (smaller) value. If the temperature of the cell is raised above the temperature at which it was poled, the decrease in intrinsic tilt angle consequent upon that temperature increase will produce an expansion of the thickness of the smectic layers which expands the spacing at which they are pinned at the confining surfaces. The geometry remains bookshelf geometry, but the measured value $\phi$ is reduced from the value produced immediately subsequent to poling by virtue of the fact that the intrinsic tilt angle is reduced. If subsequently the temperature is reduced to its former temperature, the temperature at which it was initially poled, the measured value $\phi$ is not restored to its former value because bookshelf geometry is not preserved during the cooling. Bookshelf geometry is not preserved because the smectic layers are pinned at the confining surfaces at the spacing approximate to the higher temperature, and thus a chevron structure is formed. Accordingly, instead of a full restoration of the measured value $\phi$ to its former value, there is a partial restoration towards that former value.

All the specifically described examples have related to materials with a relatively high spontaneous polarisation and relatively low dielectric anisotropy at the poling temperature, and so the application of a low frequency poling field with a period longer than the response time of the liquid crystal material will produce the condition in which the torque exerted upon the liquid crystal molecules that is provided by interaction of the applied field with the dielectric anisotropy induced dipole moment is dominated by the torque produced by its interaction with the spontaneous polarisation dipole moment.

I claim:

1. A method of making a ferroelectric liquid crystal cell that exhibits bistability in the absence of any sustaining applied field, wherein a liquid crystal layer is confined between two surfaces at least one of which is the surface of an obliquely evaporated layer of inorganic material having a surface texture that, in a non-inclined liquid crystal phase of the liquid crystal layer, promotes alignment of the liquid crystal molecules in contact therewith in a direction lying in or having a major component in the plane of said textured surface, wherein the material of the liquid crystal layer is cooled so as to make a transition into a ferroelectric inclined smectic phase, said cooling being under conditions inducing a non-planar prismatic-arrangement of the smectic layers in the inclined smectic phase with the prismatic axis being defined in relation to the axis of oblique evaporation and the plane of the textured surface, wherein an alternating potential is applied across the thickness of the cell, which alternating potential is of sufficient magnitude to induce a planarising rearrangement of the smectic layer structure providing a substantially bookshelf arrangement of the smectic layers that, while the liquid crystal layer is maintained at the temperature at which said alternating potential was applied, persists after removal of said potential.

2. A method of making a ferroelectric liquid crystal cell as claimed in claim 1, wherein both surfaces between which the liquid crystal layer is confined are surfaces of obliquely evaporated inorganic material.

3. A method of making a ferroelectric liquid crystal cell as claimed in claim 1, wherein said material of said at least one surface of obliquely evaporated inorganic material is silicon monoxide.

4. A method of making a ferroelectric liquid crystal cell as claimed in claim 1, wherein said material of said at least one surface of obliquely evaporated inorganic material is magnesium fluoride.

5. A method of making a ferroelectric liquid crystal cell as claimed in claim 1, wherein the material of the liquid crystal layer exhibits the phase sequence $S_C^* - S_A - N^* - I$, and is substantially pitch-compensated at the $S_A - N^*$ transition temperature.

6. A method of making a ferroelectric liquid crystal cell as claimed in claim 1, wherein the temperature at which said alternating potential is applied and the frequency of its alternation are chosen, in relation to the spontaneous polarisation, dielectric anisotropy and response time of the material of the liquid crystal layer at said temperature, such that the period of thepoling frequency is longer than the response time of the material of the liquid crystal layer, and such that the torque exerted upon the liquid crystal molecules that is provided by interaction of the electric field of said alternating potential with the dielectric anisotropy induced dipole moment is dominated by the torque provided by its interaction with the spontaneous polarisation dipole moment of the material of the liquid crystal layer.

7. A method of making a ferroelectric liquid crystal cell as claimed in claim 6, wherein the material of the liquid crystal layer exhibits the phase sequence $S_C^* - S_A - N^* - I$, and is substantially pitch-compensated at the $S_A - N^*$ transition temperature.

8. A method of making a ferroelectric liquid crystal cell as claimed in claim 6, wherein both surfaces between which the liquid crystal layer is confined are surfaces of obliquely evaporated inorganic material.

9. A method of making a ferroelectric liquid crystal cell as claimed in claim 8, wherein the material of the liquid crystal layer exhibits the phase sequence $S_C^* - S_A - N^* - I$, and is substantially pitch-compensated at the $S_A - N^*$ transition temperature.

10. A ferroelectric liquid crystal cell which cell has a liquid crystal layer confined between two surfaces at least one of which is the surface of an obliquely evaporated layer of inorganic material having a surface texture that in a non-inclined liquid crystal phase of the liquid crystal layer promotes alignment of the liquid crystal molecules in contact therewith in a direction lying in or having a major component in the plane of said textured surface, wherein said cell, having been subjected to poling subsequent to the entry of the liquid crystal layer into its ferroelectric liquid crystal phase, exhibits bistability in the absence of any sustaining applied field, said poling effecting rearrangement of the smectic layers, by means of the application of an alternating potential across the thickness of the liquid crystal layer, from a non-planar prismatic arrangement to a substantially planar bookshelf alignment that, while the liquid crystal layer is maintained at the temperature at which said potential is applied, persists after removal of said potential.

11. A ferroelectric liquid crystal cell as claimed in claim 10 wherein both surfaces between which the liquid crystal layer is confined are surfaces of obliquely evaporated inorganic material.

12. A ferroelectric liquid crystal cell as claimed in claim 10, wherein said material of said at least one surface of obliquely evaporated inorganic material is silicon monoxide.

13. A ferroelectric liquid crystal cell as claimed in claim 10, wherein said material of said at least one surface of obliquely evaporated inorganic material is magnesium fluoride.

14. A ferroelectric liquid crystal cell as claimed in claim 10, wherein the material of the liquid crystal layer exhibits the phase sequence $S_C^* - S_A - N^* - I$, and is substantially pitch-compensated at the $S_A - N$ transition temperature.

15. A ferroelectric liquid crystal cell as claimed in claim 14, wherein both surfaces between which the liquid crystal layer is confined are surfaces of obliquely evaporated inorganic material.

* * * * *